(12) United States Patent
Balan et al.

(10) Patent No.: US 8,995,410 B2
(45) Date of Patent: Mar. 31, 2015

(54) AIRSYNC: ENABLING DISTRIBUTED MULTIUSER MIMO WITH FULL MULTIPLEXING GAIN

(71) Applicants: Horia Vlad Balan, Los Angeles, CA (US); Konstantinos Psounis, Pacific Palisades, CA (US); Giuseppe Caire, South Pasadena, CA (US)

(72) Inventors: Horia Vlad Balan, Los Angeles, CA (US); Konstantinos Psounis, Pacific Palisades, CA (US); Giuseppe Caire, South Pasadena, CA (US)

(73) Assignee: University of Southern California, Los Angeles, CA (US)

( * ) Notice: Subject to any disclaimer, the term of this patent is extended or adjusted under 35 U.S.C. 154(b) by 68 days.

(21) Appl. No.: 13/895,181

(22) Filed: May 15, 2013

(65) Prior Publication Data

US 2013/0315211 A1 Nov. 28, 2013

Related U.S. Application Data

(60) Provisional application No. 61/651,964, filed on May 25, 2012.

(51) Int. Cl.
*H04B 7/06* (2006.01)
*H04L 27/26* (2006.01)
(Continued)

(52) U.S. Cl.
CPC ............ *H04B 7/0697* (2013.01); *H04B 7/0452* (2013.01); *H04L 5/0023* (2013.01); *H04L 5/0035* (2013.01); *H04L 27/266* (2013.01); *H04L 27/2663* (2013.01); *H04L 27/2672* (2013.01);
(Continued)

(58) Field of Classification Search
CPC .......................... H04B 7/0697; H04L 27/2675
USPC ......... 370/336, 338, 345–346, 349, 389, 392, 370/400–401, 428, 442, 465, 498, 500
See application file for complete search history.

(56) References Cited

U.S. PATENT DOCUMENTS

| 5,590,403 | A | * | 12/1996 | Cameron et al. | ............... 455/503 |
| 6,532,228 | B1 | * | 3/2003 | Burgess et al. | ............... 370/349 |
| 6,639,905 | B1 | * | 10/2003 | Muller et al. | ................. 370/336 |

(Continued)

FOREIGN PATENT DOCUMENTS

KR 10-2008-0022031 A1 3/2008

OTHER PUBLICATIONS

IEEE Computer Society. 2009. IEEE 802.11n Standard for Information Technology—Telecommunications and Information Exchange Between systems—Local and Metropolitan Area Networks—Specific Requirements. Part 11: Wireless LAN Medium Access Control (MAC) and Physical Layer (PHY) Specifications. IEEE Computer Society. 536 pages.

(Continued)

*Primary Examiner* — Kevin Mew
(74) *Attorney, Agent, or Firm* — McDermott Will & Emery LLP (57) ABSTRACT

Time and phase synchronization may enable distributed multiuser multiple-input multiple-output (MIMO) architectures and techniques, such as supported by the IEEE 802.11n standard, where several access points are connected to a central server and operate as a large distributed multi-antenna access point. The phase of all access points can be locked using a common reference (e.g., a synchronization tone) broadcasted over the air in conjunction with a predictive filter (e.g., a Kalman filter) which closely tracks the phase drift for each subcarrier channel.

14 Claims, 6 Drawing Sheets

(51) Int. Cl.
*H04B 7/04* (2006.01)
*H04L 5/00* (2006.01)

(52) U.S. Cl.
CPC ........ *H04L 27/2675* (2013.01); *H04L 27/2692* (2013.01)
USPC ........................................................ 370/336

(56) References Cited

U.S. PATENT DOCUMENTS

| | | | |
|---|---|---|---|
| 6,950,408 B1* | 9/2005 | Domon et al. | 370/257 |
| 7,315,532 B2* | 1/2008 | Aaltonen et al. | 370/336 |
| 2002/0159434 A1* | 10/2002 | Gosior et al. | 370/350 |
| 2003/0058951 A1 | 3/2003 | Thomson et al. | |
| 2003/0063678 A1 | 4/2003 | Crawford | |
| 2005/0220215 A1* | 10/2005 | Tanabe et al. | 375/295 |
| 2005/0281241 A1* | 12/2005 | Webster et al. | 370/343 |
| 2007/0183392 A1* | 8/2007 | Tandai et al. | 370/350 |
| 2010/0215133 A1* | 8/2010 | Stebbings et al. | 375/354 |
| 2011/0064156 A1 | 3/2011 | Kim et al. | |
| 2011/0149868 A1 | 6/2011 | Krishnamurthy | |
| 2011/0246675 A1* | 10/2011 | Fukami | 710/8 |
| 2012/0121003 A1 | 5/2012 | Kleider et al. | |
| 2014/0254459 A1* | 9/2014 | Gelal et al. | 370/312 |

OTHER PUBLICATIONS

Kobayashi, M. et al. 2006. Joint Beamforming and Scheduling for a MIMO Downlink with Random Arrivals. IEEE ISIT Seattle, Jul. 9-14, 2006, pp. 1442-1446.

International Search Report & Written Opinion of the International Searching Authority (KR), mailed Aug. 28, 2013, for corresponding PCT Application No. PCT/US2013/041415, filed May 16, 2013, entitled "Enabling Distributed Multiuser MIMO with Full Multiplexing Gain."

* cited by examiner

AIRSYNC: ENABLING DISTRIBUTED MULTIUSER MIMO WITH FULL MULTIPLEXING GAIN

RELATED APPLICATION

This application claims the benefit of and priority to U.S. Provisional Application No. 61/651,964 filed May 25, 2012, and entitled "AirSync: Enabling Distributed Multiuser MIMO with Full Multiplexing Gain," the entire content of which (including all exhibits) is incorporated herein by reference.

BACKGROUND

1. Technical Field

This disclosure relates generally to wireless communications, and more particularly to multiple-input multiple-output (MIMO) systems, architectures and techniques.

2. Description of Related Art

The enormous success of advanced wireless devices is pushing the demand for higher wireless data rates. Denser spectrum reuse through the deployment of more access points per square mile has the potential to successfully meet the increasing demand for more bandwidth.

In theory, the best approach to density increase is via distributed multiuser multiple-input multiple-output (MIMO) architectures and techniques, such as supported by the IEEE 802.11n standard, where several access points are connected to a central server and operate as a large distributed multi-antenna access point, ensuring that all transmitted signal power serves the purpose of data transmission, rather than creating "interference." In practice, while enterprise networks offer a natural setup in which distributed MIMO might be possible, there are serious implementation difficulties, the primary one being the need to eliminate phase and timing offsets between the jointly coordinated access points.

However, distributed multiuser MIMO is regarded today mostly as a theoretical solution because of some serious implementation hurdles, such as the ability to eliminate phase and timing offsets between jointly coordinated access points and the ability to perform efficient joint encoding at a central server linked to the access points through wired links of limited capacity.

Figure 1:
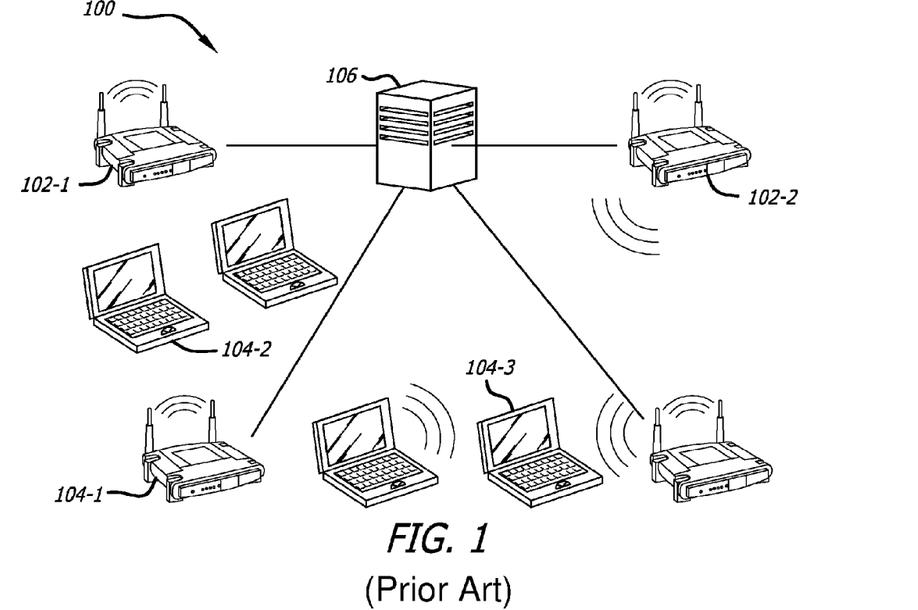
FIG. 1 depicts a diagram of an Enterprise Wifi and Distributed MIMO network.

FIG. 1 depicts a diagram of an Enterprise Wifi and Distributed MIMO network. The network 100 includes a number of access point (or, transmitters) 102-1 and 102-2 transmitting to a number of clients (or, receivers) 104-1 through 104-3. The transmitters typically have wired links, e.g., by an Ethernet, to a central server 106. The multiple access points coordinate their transmissions to several clients by using distributed MIMO. Since in such networks the wired links connecting the access points are typically fast enough to allow for efficient joint processing at a server, the major obstacle to achieve the full potential of distributed MIMO gains has been eliminating the phase offsets between the different access points. The perceived difficulty of this task has led some researchers to believe that it is practically impossible to achieve full spatial multiplexing in the context of distributed MIMO.

SUMMARY

The subject technology described herein includes a novel scheme that provides not only time but also phase synchronization, thus enabling distributed MIMO (e.g., as supported by the IEEE 802.11n standard) with full spatial multiplexing gains. The subject technology can lock the phase of all access points using a common reference (e.g., a synchronization tone) broadcasted over the air in conjunction with a predictive filter (e.g., a Kalman filter) which closely tracks the phase drift.

In one aspect, the subject technology provides systems suitable for implementing distributed multi-user MIMO with spatial multiplexing.

An example of such a system can include a main transmitter (or, main access point) configured to transmit (i) a reference signal, e.g., including one or more pilot tones/signals, which may be transmitted outside a particular transmission band (e.g., outside a data band used with a 2.4 GHz carrier frequency), and (ii) a packet with an initial probing header, wherein the probing header can include a number of channel estimation symbols and is configured to be used by other transmitters (or, access points) to obtain an initial phase estimate for each carrier; and one or more secondary transmitters configured to receive the probing header transmitted by the main transmitter (or, access point) and determine a block timing of the packet.

Each secondary transmitter can decode frames of the incoming packet (e.g., using a discrete Fourier transform or other suitable transform) and obtain the phase(s) of the received soft symbols in radians, e.g., using the coordinate rotation digital computer ("CORDIC") algorithm or other suitable algorithm.

Each secondary transmitter can track the phase of the out of band pilot tone/signal for estimating (or, measuring) the associated phase drift from the main transmitter. The measurements of the different pilot tones/signals by the secondary transmitters can be provided (in some embodiments, possibly after averaging) to a predictive filter (e.g., a Kalman filter) to maintain an accurate estimate of the phase drift(s) and predict, based on the current estimate, the future drift after the passage of a few frames. Each transmitter can estimate its own channel state or channel matrix coefficients.

The phase estimates can be used in synthesizing a synchronized signal. Each secondary transmitter can use an appropriate transform (e.g., an inverse discrete Fourier transform), the output frames of which are timed such that they align with the frames of the signal from the main transmitter.

The system can include a server, e.g., one having suitable memory and processing functionality. The server can be connected to the main transmitter. The server can be connected to one or more secondary transmitters. The server can compute the waveform of the signal to be transmitter to each transmitter, e.g., as scheduled after dividing downlink time into slots for each transmitter.

In another aspect, the subject technology provides methods (also referred to as techniques or schemes) for implementing distributed multi-user MIMO with spatial multiplexing. An example of such a MIMO method can include: transmitting, e.g., from a main transmitter (or, main access point) (i) a reference signal, e.g., including one or more pilot tones/signals, which may be transmitted outside a particular transmission band (e.g., outside a data band used with a 2.4 GHz carrier frequency), and (ii) a packet with an initial probing header, wherein the probing header can include a number of channel estimation symbols and is configured to be used by other transmitters (or, access points) to obtain an initial phase estimate for each carrier; and one or more secondary transmitters configured to receive the probing header transmitted by the main transmitter (or, access point) and determine a block timing of the packet.

The method can include decoding of the frames of the incoming packet (e.g., using a discrete Fourier transform or other suitable transform) and obtaining the phase(s) of the received soft symbols in radians (e.g., using the CORDIC algorithm or other suitable algorithm). The out of band pilot tone/signal can be tracked, e.g., by the respective secondary transmitter, for estimating (or, measuring) the associated phase drift from the main transmitter. The measurements of the different pilot tones/signals by the secondary transmitters can be provided (in some embodiments, possibly after averaging) to a predictive filter (e.g., a Kalman filter) to maintain an accurate estimate of the phase drift(s) for predicting, based on the current estimate, the future drift after the passage of a few frames. Estimating the channel state or channel matrix coefficients can be performed for each transmitter. The phase estimates can be used in synthesizing a synchronized signal. A waveform for each transmitter can be computed, e.g., by a server.

The features and advantages of the present invention will be readily apparent to those skilled in the art upon a reading of the description of the preferred embodiments that follows.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

While certain embodiments and aspects of the subject technology are depicted in the drawings, those skilled in the art will appreciate that the embodiments and aspects depicted are illustrative and that variations of those shown, as well as other embodiments and aspects described herein, may be envisioned and practiced within the scope of the present disclosure.

DETAILED DESCRIPTION

Illustrative embodiments are now discussed and illustrated. Other embodiments may be used in addition or instead. Details which may be apparent or unnecessary may be omitted to save space or for a more effective presentation. Conversely, some embodiments may be practiced without all of the details which are disclosed.

The subject technology described herein, instances of which are referred to as "AirSync" or AirSync™ technology, includes a novel scheme that provides not only time but also phase synchronization, thus enabling distributed MIMO (e.g., as supported by the IEEE 802.11n standard) with full spatial multiplexing gains. AirSync can lock the phase of all access points using a common reference (e.g., a synchronization tone) broadcasted over the air in conjunction with a predictive filter (e.g., a Kalman filter) which closely tracks the phase drift. As is described in further detail below, an exemplary embodiment of AirSync technology has been implemented as a digital circuit in a field programmable gate array (FPGA) of a WARP radio platform.

In one aspect, the subject technology provides systems suitable for implementing distributed multi-user MIMO with spatial multiplexing. An example of such a system can include a main transmitter (or, main access point) configured to transmit (i) a reference signal, e.g., including one or more pilot tones/signals, which may be transmitted outside a particular transmission band (e.g., outside a data band used with a 2.4 GHz carrier frequency), and (ii) a packet with an initial probing header, wherein the probing header can include a number of channel estimation symbols and is configured to be used by other transmitters (or, access points) to obtain an initial phase estimate for each carrier; and one or more secondary transmitters configured to receive the probing header transmitted by the main transmitter (or, access point) and determine a block timing of the packet.

Each secondary transmitter can decode frames of the incoming packet (e.g., using a discrete Fourier transform or other suitable transform) and obtain the phase(s) of the received soft symbols in radians (e.g., using the CORDIC algorithm or other suitable algorithm). Each secondary transmitter can track the phase of the out of band pilot tone/signal for estimating (or, measuring) the associated phase drift from the main transmitter. The measurements of the different pilot tones/signals by the secondary transmitters can be provided (in some embodiments, possibly after averaging) to a predictive filter (e.g., a Kalman filter) to maintain an accurate estimate of the phase drift(s) and predict, based on the current estimate, the future drift after the passage of a few frames. Each transmitter can estimate its own channel state or channel matrix coefficients.

The phase estimates can be used in synthesizing a synchronized signal. Each secondary transmitter can use an appropriate transform (e.g., an inverse discrete Fourier transform), the output frames of which are timed such that they align with the frames of the signal from the main transmitter.

The system can include a server, e.g., one having suitable memory and processing functionality. The server can be connected to the main transmitter. The server can be connected to one or more secondary transmitters. The server can compute the waveform of the signal to be transmitter to each transmitter, e.g., as scheduled after dividing downlink time into slots for each transmitter.

In another aspect, the subject technology provides methods (also referred to as techniques or schemes) for implementing distributed multi-user MIMO with spatial multiplexing. An example of such a MIMO method can include: transmitting, e.g., from a main transmitter (or, main access point) (i) a reference signal, e.g., including one or more pilot tones/signals, which may be transmitted outside a particular transmission band (e.g., outside a data band used with a 2.4 GHz carrier frequency), and (ii) a packet with an initial probing header, wherein the probing header can include a number of channel estimation symbols and is configured to be used by other transmitters (or, access points) to obtain an initial phase estimate for each carrier; and one or more secondary transmitters configured to receive the probing header transmitted by the main transmitter (or, access point) and determine a block timing of the packet.

The method can include decoding of the frames of the incoming packet (e.g., using a discrete Fourier transform or other suitable transform) and obtaining the phase(s) of the received soft symbols in radians (e.g., using the CORDIC algorithm or other suitable algorithm). The out of band pilot tone/signal can be tracked, e.g., by the respective secondary transmitter, for estimating (or, measuring) the associated phase drift from the main transmitter. The measurements of the different pilot tones/signals by the secondary transmitters can be provided (in some embodiments, possibly after averaging) to a predictive filter (e.g., a Kalman filter) to maintain an accurate estimate of the phase drift(s) and predict, based on the current estimate, the future drift after the passage of a few frames. Estimating the channel state or channel matrix coefficients can be performed for each transmitter. The phase estimates can be used in synthesizing a synchronized signal. A waveform for each transmitter can be computed, e.g., by a server.

Simultaneous OFDM signal transmissions which are not separated in the spatial domain require precise frame alignment to maintain their frequency orthogonality. Two signals whose frame boundaries misalign by more than a cyclic prefix length cannot be reliably decoded due to interference leakage over the frequency domain during the decoding process. Frame alignment has been used in conjunction with space-time block coding in order to provide a diversity gain in a distributed MIMO downlink system. In Fine-Grained Channel Access, a similar technique allows for multiple independent clients to share the frequency band in fine increments, without a need for guard bands, resulting in a flexible OFDMA (OFDM with orthogonal multiple access) uplink implementation.

OFDM has become the preferred digital signaling format in most modern broadband wireless networks, including WLANs IEEE 802.11a/g/n and 4G cellular systems. Its main characteristic is that it decomposes a frequency selective channel into a set of N parallel narrowband frequency-flat channels, where the number of frequency subcarriers N is a system design parameter. In a multiuser environment it has also a significant side advantage: as long as the different users' signals align in time with an offset smaller than a guard time interval called the cyclic prefix (CP), their symbols after OFDM demodulation will remain perfectly aligned on the time-frequency grid. In other words, the timing misalignment problem between user signals, which in single-carrier systems creates significant complications for joint processing of overlapping signals (e.g., multiuser detection, successive interference cancellation, Zig-Zag decoding), completely disappears in the case of OFDM, provided that all users achieve a rather coarse timing alignment within the CP. It is noted that typical CP length is between 16 and 64 times longer than the duration of an equivalent single-carrier symbol. For example, for a 20 MHz signal, as in standard 802.11g, the time-domain symbol interval is 50 ns, so that a typical CP length ranges between 0.7 and 3.2 µs.

In a point-to-point MIMO link with $N_r$ receive antennas and $N_t$ transmit antennas, the time-domain channel is represented by an $N_r \times N_t$ matrix of channel impulse responses. For the frequency domain, the channel transfer function is described by a set of channel matrices of dimension $N_r \times N_t$, one for each of the N OFDM subcarriers. Because signals add linearly over the shared medium, the signal received at each client antenna is a linear combination of the signals sent from the access point's antennas. The receiver, having knowledge of the channel coefficients, is tasked with solving a linear system of $N_r$ equations with $N_t$ unknowns from which it can generally recover up to $\min(N_r, N_t)$ transmitted symbols (this is multiplexing gain, or degrees of freedom). Since the OFDM modulation breaks the spectrum into narrow subcarriers, this process is repeated on each independent subcarrier.

In contrast to point-to-point MIMO, in multiuser MIMO the receiver antennas are spatially separated and receivers are not generally able to communicate with one another. While before the receiver could find the sent symbols by just solving a set of linear equations, now each receiver has only one equation with several unknowns. In order to be able to solve for the variable of interest (the symbol intended for that receiver), the contributions of all other unknowns can be arranged to cancel each other out in its particular equation. One of the techniques to achieve this is linear Zero-Forcing Beamforming (ZFBF).

In ZFBF, the transmitter multiplies the outgoing symbols by beamforming vectors such that the receivers see only their intended signals. For instance, let the received signal on a given subcarrier at user k be given by $$y_k = h_{k,1} x_1 + h_{k,2} x_2 + \ldots + h_{k,N_t} x_{N_t} + z_k \quad (1)$$

where $h_{k,j}$ is the channel coefficient from transmit antenna j to user k and $z_k$ is additive white Gaussian noise. Then, the vector of all received signals can be written in matrix form as $$y = Hx + z \quad (2)$$

where H has dimension $K \times N_t$, K denoting the number of single-antenna clients. Assuming $K \leq N_t$, it is a goal to find a matrix V such that HV is zero for all elements except the main diagonal, that is $HV = \text{diag}(\lambda_1, \ldots, \lambda_K)$. When this occurs, then $$y = HVx + z = \text{diag}(\lambda_1, \ldots, \lambda_K) x + z, \quad (3)$$

assuring that each receiver k will see $y_k = \lambda_k x_k + z_k$, which is an independent channel with no interference.

When H has rank K (which is true with probability 1 for sufficiently rich propagation scattering environments typical of WLANs and for $K \leq N_t$) a column normalized version of the Moore-Penrose Pseudoinverse generally yields the ZFBF matrix. This takes on the form $$V = H^H (HH^H)^{-1} \Lambda,$$

where $\Lambda = \text{diag}(\lambda_1, \ldots, \lambda_K)$ ensures that the norm of each column of V is equal to 1, thus setting the total transmit power equal to $\text{tr}(\text{Cov}(Vx)) = \mathbb{E}[\|x\|^2]$, i.e., equal to the power of the transmitted data vector x. Since, by construction, $HV = \Lambda$ is a diagonal matrix, it follows that left multiplying the vector of user symbols with the beamforming matrix cancels out the symbol interference at the receivers.

Time and phase synchronization are needed between transmitters in order for such precoding to work. Clearly, time synchronization is needed to coordinate transmissions, but because OFDM gives some leeway due to the cyclic prefix, this is a relatively coarse synchronization. Phase synchronization, however, is required since ZFBF relies on being able to precisely tune the phase of a signal arriving at a receiver. While a classic MIMO transmitter has all of its RF chains running on a single clock source, each access point in a distributed MIMO system has its own clock and thus the signal it produces drifts in phase with respect to the signals of the other access points. Sufficiently accurate phase synchronization can be a necessary condition in order to realize implementations of distributed multiuser MIMO.

For simplicity of exposition, la distributed multiuser MIMO scenario can be considered with two clients and two access points, each one with a single antenna. These considerations can apply equally to a more general scenario. For nomadic users, typical of WLAN scenarios, the channel changes quite slowly with time, so that it may be assumed that the channel impulse response is locally invariant with respect to time. In order to use ZFBF, the channel matrix coefficients can be estimated at each subcarrier for each transmitter/receiver antenna combination. A number of methods for estimating channel coefficients may be suitable, including feedback schemes and exploiting uplink/downlink reciprocity in Time-Division Duplex (TDD) systems. For simplicity of exposition, it may be assume here that the channel estimates correspond perfectly to the real channel.

After the channels have been estimated, all of the access points send their channel estimates to a central server, which computes the precoding matrix. For each subcarrier $n=1, \ldots, N$, let $$H(n) = \begin{bmatrix} H_{11}(n) & H_{12}(n) \\ H_{21}(n) & H_{22}(n) \end{bmatrix} \quad (4)$$

denote the 2×2 downlink channel matrix between the two clients and the two access point antennas.

Let the precoding matrix $V(n)$ of subcarrier n be such that $H(n)V(n)=\Lambda(n)=\mathrm{diag}(\lambda_1(n), \lambda_2(n))$, as explained before. If timing and carrier phase reference remain unchanged from when the channel was estimated until the signal is transmitted, the received signal at the clients, on each subcarrier, can be written as $$y(n)=H(n)V(n)x(n)+z(n)=\Lambda(n)x(n)+z(n) \quad (5)$$

Since the overall channel matrix $\Lambda(n)$ is diagonal, complete user separation is achieved, so that the access point can serve the two clients on the same downlink slot without interference. The spatial multiplexing gain in this case is 2, as two users are being served simultaneously on the same time-frequency resource.

Suppose now that the timing reference and carrier phase reference between the estimation and transmission slots of the two access point is not ideal. With perfect timing, the downlink channel from access point i to client j would have impulse response $h_{ij}(\tau)$. Instead, due to misalignment, the impulse response is $h_{ij}(\tau-\tau_i-\delta_j)e^{j(\phi_i+\theta_j)}$ where $\tau_i$, $\phi_i$ are the timing and carrier phase shifts at access point i and $\delta_j$, $\theta_j$ are the timing and carrier phase shifts at client j. For simplicity, assume that the timing shifts are integer multiples of the time-domain symbol interval $T_s$ (otherwise the derivation is more complicated, involving the folded spectrum of the channel frequency response, but the end result is analogous). From the well-known rules of linearity and time-shift of the discrete Fourier transform, the following expression for the effective channel matrix is derived:

$$\tilde{H}(n) = \underbrace{\begin{bmatrix} e^{j\left(\frac{2\pi}{NT_s}\delta_1 n+\theta_1\right)} & 0 \\ 0 & e^{j\left(\frac{2\pi}{NT_s}\delta_2 n+\theta_2\right)} \end{bmatrix}}_{\Theta(n)} \quad (6)$$

$$\begin{bmatrix} H_{11}(n) & H_{12}(n) \\ H_{21}(n) & H_{22}(n) \end{bmatrix} \underbrace{\begin{bmatrix} e^{j\left(\frac{2\pi}{NT_s}\tau_1 n+\phi_1\right)} & 0 \\ 0 & e^{j\left(\frac{2\pi}{NT_s}\tau_2 n+\phi_2\right)} \end{bmatrix}}_{\Phi(n)}$$

The diagonal matrix of phasors $\Theta(n)$ multiplying the nominal channel matrix from the left presents no problems, since these phase shifts can be recovered individually by each client as in standard coherent communication. In contrast, the diagonal matrix $\Phi(n)$ multiplying from the right poses a significant problem, since in each receiver's equation each unknown will be further multiplied by a different random factor. In fact, since the server computes the MIMO precoding matrix $V(n)$ based on $H(n)$, it follows that when applied to the effective channel $\tilde{H}(n)$ in (6) the matrix multiplication $\tilde{H}(n)V(n)$ is no longer necessarily diagonal. Thus, the presence of timing and carrier phase misalignment between the estimation and transmission slots, at each individual access point, yields residual multiuser interference which may completely destroy the performance of a distributed multiuser MIMO system. To stress the importance of this aspect it should be understood that the resulting signal mixing takes place over the actual transmission channel, making it impossible for the receivers to eliminate it.

Any discussion on phase synchronization of distributed wireless transmitters must necessarily start with the mechanisms through which phase errors occur. Digital wireless transmission systems are constructed using a number of clock sources, among the two most important ones are the sampling clock and the carrier clock. In a typical system, signals are created in a digital form in baseband at a sampling rate on the order of megahertz, then passed through a digital-to-analog converter (DAC). Through the use of interpolators and filters, the DAC creates a smooth analog waveform signal which is then multiplied by a sinusoidal carrier produced by the carrier clock. The result is a passband signal which is then sent over the antenna.

Wireless receivers, in turn, use a chain of signal multiplications and filters to create a baseband version of the passband signal received over the antenna. Some designs, such as the common superheterodyne receivers, use multiple high frequency clocks and convert a signal first to an intermediate frequency before bringing it back to baseband. Other designs simply use a carrier clock operating at the same nominal frequency as the carrier clock of the transmitter and perform the passage from passband to baseband in a single step. After baseband conversion, the signal is sampled and the resulting digital waveform is decoded.

There may be as many as four clocks in the signal path: the transmitter's sampling clock and carrier clock and the receiver's carrier clock and sampling clock. All four clocks manifest phase drift and jitter. The drift effect, when linear in time and happening at a relatively stable rate, can be assimilated to the presence of a carrier frequency offset.

The effects of a linear phase drift on an OFDM encoded packet are considered in Equation 6. Denote by $$\omega_n = \frac{2\pi n}{NT_s}$$

the subcarrier frequency and with $\omega_c$ the carrier frequency. Let the timing error of the sampling clock be $\Delta t_s$ and the timing error of the carrier clock be $\Delta t_c$ and assume that they are on the same order of magnitude. The phase error due to the sampling clock will be $\omega_n \Delta t_s$ while the phase error due to the carrier clock will be $\phi_i = \omega_c \Delta t_c$. The term $$e^{j\left(\frac{2\pi}{NT_s}\tau_i n + \phi_i\right)}$$

in (6) can be rewritten as $e^{j(\omega_n \Delta t_s + \omega_c \Delta t_c)}$. Since $\omega_c$ is much greater than $\omega_n$, the dominant phase rotation is due to the carrier clock and does not depend on the subcarrier frequency. Moreover, since time errors are additive, if the time error is approximately linear in time (linear clock drift) then the phase error will also be linear in time and almost equal for all subcarriers.

Figure 2:
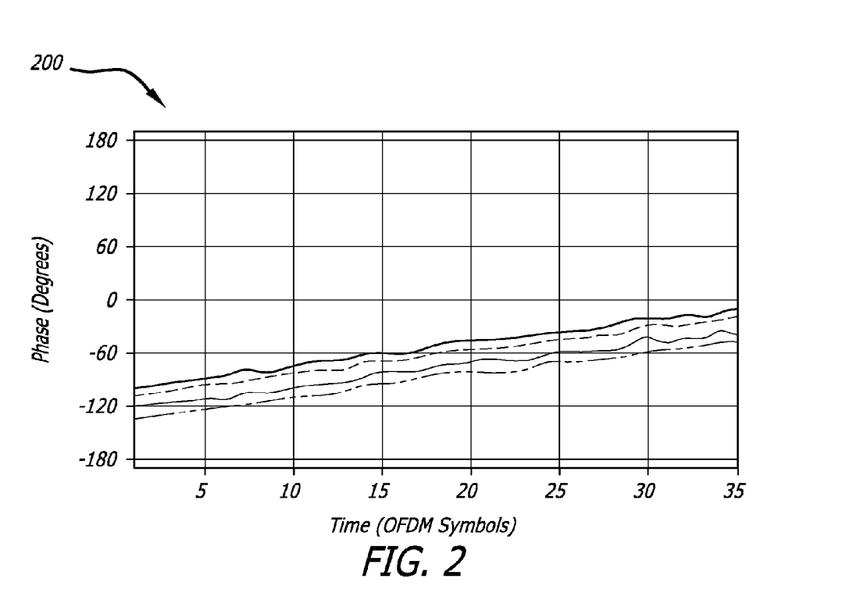
FIG. 2 depicts a linear phase drift for multiple pilot phases.

FIG. 2 depicts a set 200 of linear phase drifts for multiple pilot phases observed through experiments. The assumptions behind the above statement are verified by the results presented in FIG. 2, which depicts a linear phase drift for multiple pilot phases obtained as experimental results. An experiment was constructed in which a transmitter sent several tone signals, i.e., simple unmodulated sine waves, corresponding to several different subcarrier frequencies. In the absence of phase drift these tone signals would exhibit a constant phase when measured over several OFDM frames.

As shown in FIG. 2, the phase is not constant and the frame to frame phase drift of the tone signals can be measured and recorded. In the figure the phase drift has been plotted over the duration of a few tens of frames, a time length comparable to that of a packet transmission in a WLAN standard. As evidenced by these plots, the experiment confirms that the drift is indeed linear and does not depend on the subcarrier frequency. This allows for design of a scheme in which the drift can be tracked and predicted.

The fact that the common phase drift of all subcarriers can be predicted by observing on a few pilots tones prompts the following approach to achieving phase synchronization between access points: a main access point (master) is chosen to transmit a reference signal consisting of several pilot tones placed outside the data transmission band, in a reserved portion of the system bandwidth. An initial channel probing header, transmitted by the master access point, is used by the other transmitters in order to get an initial phase estimate for each carrier. After this initial estimate is obtained, the phase estimates will be updated using the phase drift measured by tracking the pilot signals. After the initial channel estimation header, all access points start transmitting simultaneously in the data band, making use of the continuously updated phase estimates in order to create phase synchronous signals.

The achievable precision of this synchronization method depends on two main parameters: the SNR quality of the channel linking the secondary access points to the master access point and the jitter characteristics of the oscillator clocks. The impact of jitter can be estimated using the following back-of-the envelope calculation. Assume the use of an oscillator having a typical precision of 0.1 ppm (parts per million) over short time durations. The phase error of the synchronization circuit due to the oscillator can be estimated by multiplying the precision value with the time length of the synchronization loop. In the system, this loop has a time length corresponding to five OFDM symbols, or 80 microseconds. When assuming a carrier frequency of 2.4 GHz the resulting predicted phase offset is 3.5 degrees, which is more than adequate for purposes here as is evident from the experimental results that are presented below. Capacity region calculations show that with this precision of synchronization, ZFBF can create, for an uniform user power allocation, parallel channels with up to, e.g., a 27 dB SINR value.

AirSync operates similarly to other OFDM-based, distributed transmission systems such as SourceSync or Fine Grained Channel Access, but extends them by achieving phase synchronization among transmitters. An important component of those systems, essential in order to avoid leakage from one carrier to another during the decoding process, is the realization of frame alignment that arranges frame starting points at the receivers within an interval shorter than a cyclic prefix length. In other words, the overlap of the frames sent by different senders must be greater than the length of a frame without cyclic prefix in order to allow the receiver to perform a full-length discrete Fourier transform on the received signal. The use of zero-forcing does not relax this requirement. Zero-forcing is achieved by arranging the phases of several transmitted signals to sum up to almost zero at one of the receivers. The natural way in which these signals may add up to zero after applying the discrete Fourier transform is for the phase alignment between the different signals to be consistent for the whole duration of the transform. Thus the frames must overlap over the entire time interval associated with the transform. AirSync achieves frame synchronization through the insertion of pseudo-noise (PN) sequences in the master access point's packet header in order to allow the secondary transmitters and the receivers to obtain a time reference. For reasons that will become clear, achieving frame synchronization within the length of the cyclic prefix is a sufficient starting point for also achieving phase synchronization.

In the following, two signals are stated as being phase synchronous when the pure tones (that is tones that have not been multiplied with a constellation symbol for data transmission) transmitted by their senders over each subcarrier, have a constant phase difference over the duration of successive frames and this difference can be known a priori by the senders. Naturally, due to the phase offsets induced by propagation delays, the value of the phase difference depends on the location where the two signals are received. Thus the phase difference can be considered constant only when the two signals are compared at the same receive location.

AirSync implements the idea of observing phase drift using pilot tone signals. In order to reduce self-interference at the secondary transmitters, the tone signals are placed outside the data band, from which they are separated by a large guard interval. The secondary transmitters place an analog baseband filter around their data band further limiting their interference with the pilots. Self-interference could have been avoided using a number of other techniques such as antenna placement, digital compensation, or simply relying on the OFDMA like property of a frame aligned system and preventing the secondary transmitters from using the pilot subcarriers.

Figure 3:
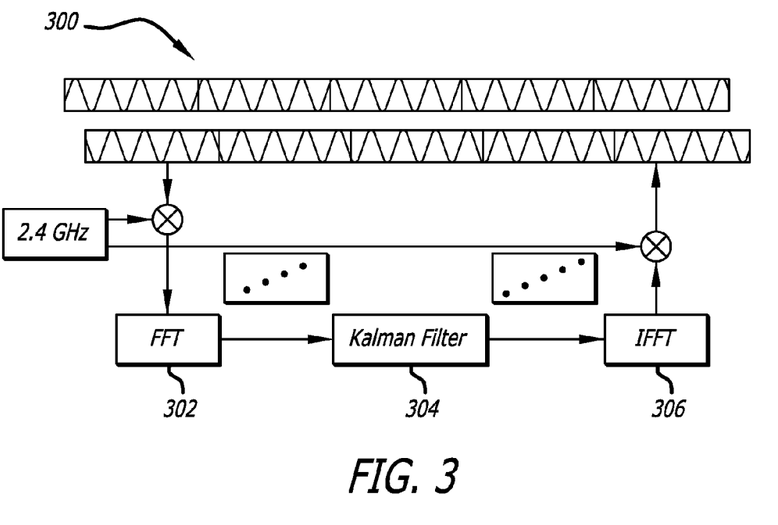
FIG. 3 depicts a signal processing diagram for a system according to the present disclosure, in which baseband signals are processed through an FFT which feeds phase estimates into a Kalman Filter; an IFFT produces a phase-adjusted data signal, with the same phase drift as the main transmitter, and the modulation and demodulation use the same carrier clock.

FIG. 3 depicts a signal processing schematic for a system 300 according to the present disclosure, in which baseband signals are processed through an FFT 302 which feeds phase estimates into a Kalman Filter 304; an IFFT 306 produces a phase-adjusted data signal, with the same phase drift as the main transmitter, and the modulation and demodulation use the same carrier clock. The baseband signals are processed through the FFT 302 which feeds phase estimates into the Kalman Filter 304. The IFFT 306 produces a phase-adjusted data signal, with the same phase drift as the main transmitter. The modulation and demodulation use the same carrier clock.

Figure 6:
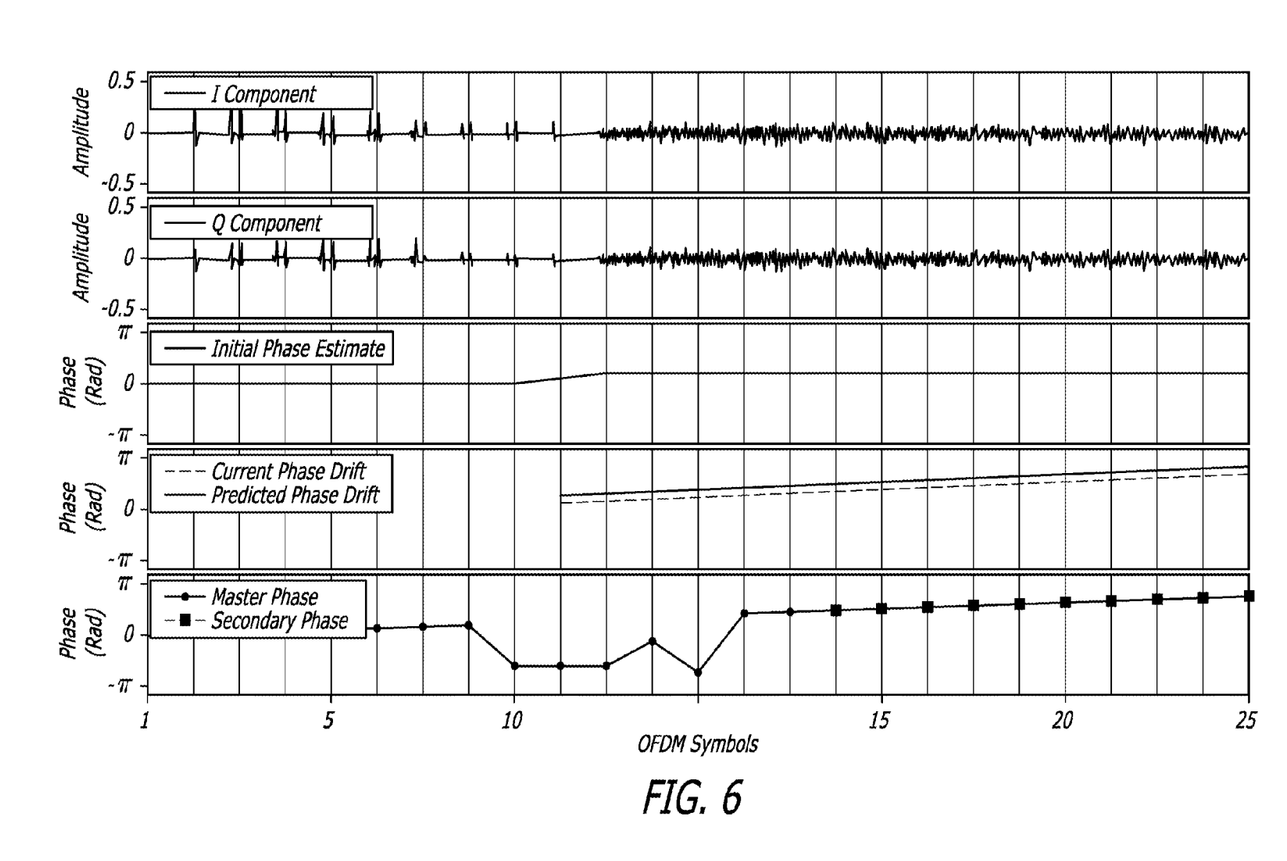
FIG. 6 is a set of plots showing phase synchronization acquisition. The secondary transmitter obtains an initial phase estimate. It then tracks the phase drift of the subcarriers and uses a Kalman filter to predict its value a few samples later.

FIG. 3 illustrates the process of creating a phase synchronous signal at the secondary transmitter while FIG. 6 presents the initial synchronization sequence. The secondary transmitter overhears a packet sent by the primary transmitter and uses the initial PN sequence in order to determine the block boundary timing of this packet. Using a discrete Fourier transform the secondary transmitter decodes the successive frames of the incoming packet. It then employs a suitable algorithm, e.g., the CORDIC algorithm, on the complex-valued received soft symbols in order to obtain their phases in radians. The phases of the out-of-band pilot signals are tracked throughout the entire packet transmission in order to estimate the phase drift from the primary sender. The measurements from the four different pilots are averaged and passed through a simplified Kalman filter which maintains an accurate estimate and predicts, based on the current estimate, the phase drift after the passage of a few further frames. In addition, the header sent by the primary sender contains a number of channel estimation symbols, used to obtain an initial phase offset estimate for each subcarrier. As mentioned previously, the phase drift is almost identical for all carriers, therefore these two measurements suffice in order to predict the phase rotation induced by the main transmitter on any subcarrier tone for the entire period of a packet.

The phase estimates are used in synthesizing a synchronized signal. The secondary transmitter uses an inverse discrete Fourier transform, whose output frames are timed such that they align with the frames of the main sender's signal. For every subcarrier the secondary transmitter rotates the soft symbol to be sent by an angle corresponding to the subcarrier's estimated phase offset. The result is a tone that, while not having the same phase as the corresponding tone from the main transmitter, follows that tone at a fixed, pre-known phase difference.

While the foregoing provides a description of a synchronization for exemplary embodiments, the synchronization circuit can be constructed or configured in different ways. For example consider SourceSync, a recent work which has implemented frame alignment. AirSync differs in the implementation approach in three important points. SourceSync performs fine frequency offset correction. AirSync avoids this correction. Frequency offset correction prevents power leakage from neighboring carriers during decoding. The synchronization circuit described previously does not decode the subcarriers in the data band but only the pilot tones, for which power leakage from neighboring carriers is not a concern, and subsumes frequency correction on the transmit side by phase synchronization. Another design decision different from SourceSync is the use of a PN sequence for block boundary detection instead of measuring the slope of the phase rotation induced by the timing misalignment between the sources on the decoded frames. The final difference from SourceSync is that since the senders are phase synchronous, the receivers do not need to monitor the evolution of the sender's pilots separately through joint channel estimation.

Centralized joint encoding is provided by transmitting phase synchronous signals from multiple access points; this creates the equivalent of a distributed MIMO transmitter, capable of employing multiuser MIMO precoding strategies in order to transmit to multiple users at the same time. However, the use of multiple access points complicates the design of the transmitter system. For most of the precoding schemes available, the encoding of the waveforms to be transmitted over the antennas must be done jointly, since reaching a single user usually involves transmitting over multiple antennas. While in theory the joint encoding process could be duplicated at each access point given the binary information destined to each user, it may be simpler to do the encoding only once, at a central server and send the resulting waveforms to each access point for transmission. This approach is practical in enterprise networks where a number of access points are already connected to a common server.

A central server used for an implemented embodiment has an individual gigabit Ethernet connection to each of the WARP radios serving as access points. The downlink time is divided into slots and in each slot schedule for transmission a number of packets destined to various users, according to an algorithm described below (along with a description of the medium access encoding of the packets). For each of the access points, the server computes the waveform of the signal to be transmitted in the next downlink slot. However, it does not perform any phase correction at this point. The only information used in the precoding is the data to be transmitted and the channel state information between each access point antenna and each user antenna. The server assumes that all access points are phase synchronous, like in a normal MIMO system. The server transmits their corresponding waveforms to all secondary transmitters and finishes by sending the last waveform to the primary transmitter. The primary transmitter starts transmitting right away and the secondary transmitters follow.

The design of AirSync ensures its scalability. There is no added overhead for synchronizing a larger number of secondary transmitters, while the overhead for channel estimation is the same as in regular MIMO systems.

In comparison to simple point-to-point transmission, AirSync uses about 10 more frames per packet in order to achieve synchronization. When compared to a single packet duration, the overhead is about 4%

Figure 4:
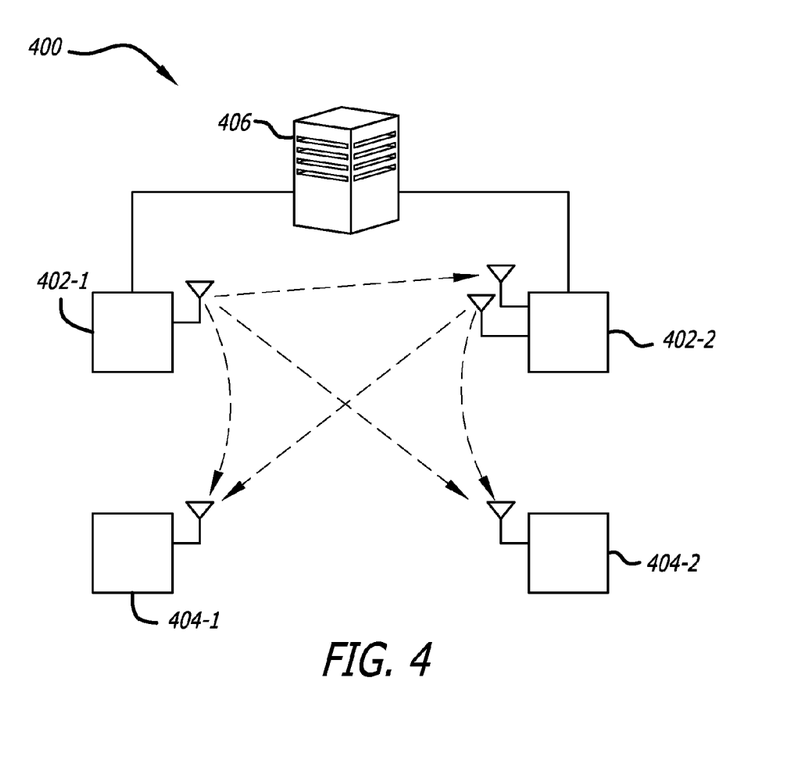
FIG. 4 depicts a diagram of an implemented embodiment having a central server connected to two transmitters, a main transmitter on the left and a secondary transmitter on the right.

FIG. 4 depicts a diagram of an implemented system 400 used as a testbed for performance evaluation. The system 400 is shown having a central server connected to two transmitters, a main transmitter 402-1 on the left and a secondary transmitter 402-2 on the right. The main transmitter 402-1 uses a single RF front-end configured in transmit mode, placing an 18 MHz shaping filter around the transmitted signal. The secondary transmitter 4-2-2 uses an RF front-end in receive mode and a second RF front-end in transmit mode, with a 12 MHz shaping filter. As mentioned previously, the pilots used in phase tracking are outside the secondary's transmission band, therefore the secondary transmitter will not interfere with the pilot signals from the main transmitter. The series of experiments was intended to test the accuracy of the synchronization and the efficiency of channel separation.

Synchronization Accuracy: In this particular experiment, the two transmitters 402-1 and 402-2 and two receivers 404-1 and 404-2 were placed at random locations. A third RF front-end was placed on the secondary transmitter 402-2 and was in receive mode. The secondary transmitter 402-2 sampled its own synthesized signal over a wired feedback loop and compared it with the main transmitter's signal. The synchronization circuit measured and recorded the phase differences between these two signals. Since the primary transmission was used as a reference, the signal synthesized by the secondary transmitter 402-2 was not broadcast in order to protect the primary transmission from unintended interference. Use of a third RF front-end is not needed in the general case.

The synchronization circuit was modified to produce a signal that was not only phase synchronous with that of the primary transmitter but had the exact same phase when observed from the secondary transmitter. To achieve this, the circuit estimated the phase rotation that was induced between the DAC of the secondary transmitter and the ADC through which the synthesized signal was resampled. It then compensated for this rotation by subtracting this value from the initial phase estimate. It is worth noting that this rotation corresponds to the propagation delay through the feedback circuit and was constant for different packet transmissions, as determined through measurements. The result was a synthesized signal that closely follows the phase of the signal broadcast by the master transmitter, as illustrated in FIG. 6. The figure illustrates the initial phase acquisition process, the initial phase estimation, the tracking and estimation of the phase drift, as well as the synthesis of the new signal. The phase discontinuities appearing in the main transmitter's signal are due to the presence of PN sequence along with a temporary disturbance needed in order to tune the feedback circuit.

Figure 5:
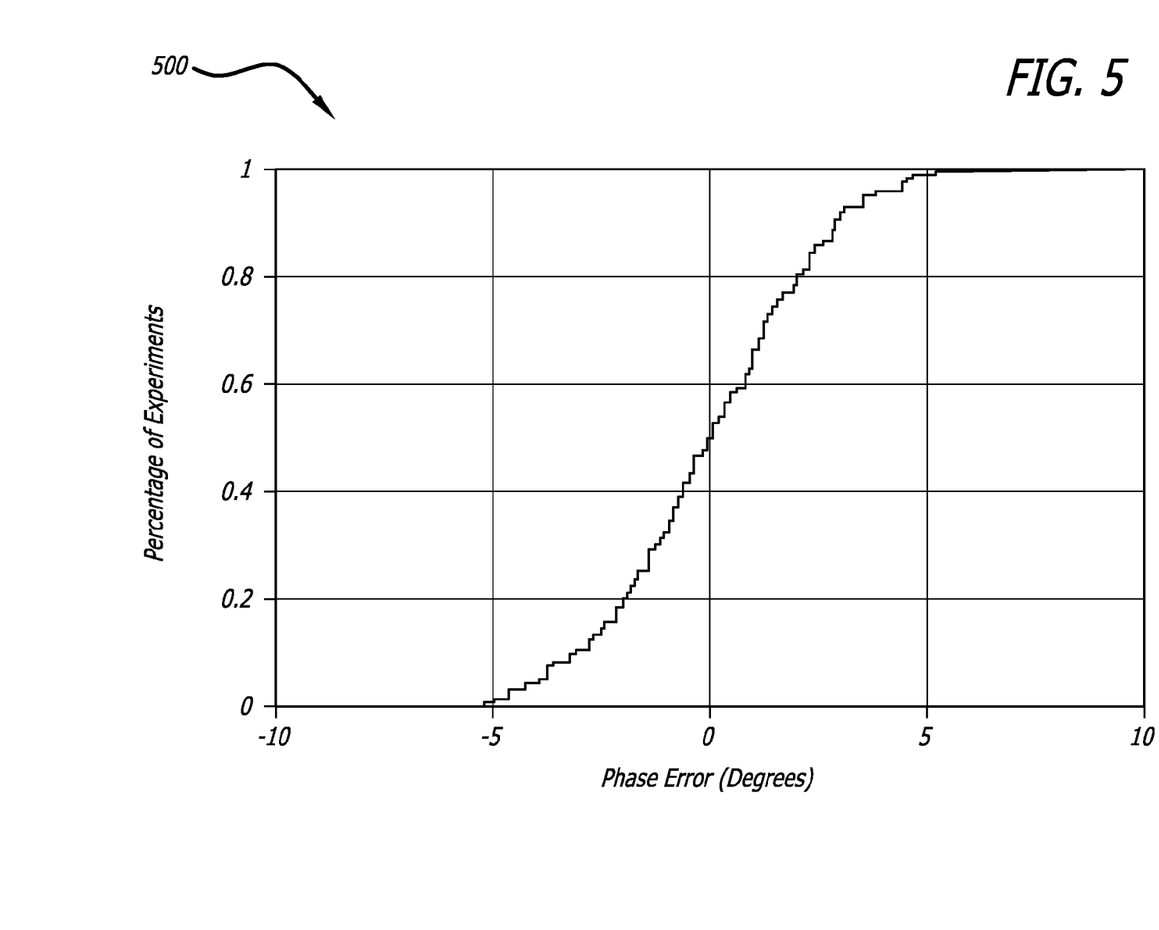
FIG. 5 is a plot of phase error performance for tested embodiments, indicating a high degree of precision of phase synchronization. AirSync achieves phase synchronization within a few degrees of the source signal.

FIG. 5 is a plot 500 illustrating the cumulative distribution function ("CDF") of the synchronization error between the secondary transmitter and the primary transmitter. The error is measured on a frame-to-frame basis using the feedback circuit. In decimal degree values, the standard deviation is 2.37 degrees. The $95^{th}$ percentile of the synchronization error is at most 4.5 degrees.

The SNR value of the synchronization pilots in the signal received by the secondary transmitter was measured to be approximately 28.5 dB. This is easily achievable between typically placed access points.

Beamforming gain: a second experiment was performed using the complete four radio setup with the secondary transmitter broadcasting a secondary signal over the air. The channel coefficients were measured between the two transmitters and the receivers using standard downlink channel estimation techniques; and arranged the amplitudes and the phases of the transmitted signals were arranged such that at one of the receivers the amplitudes of the two transmitted signals would be equal while the phases would align. The maximal theoretic power gain over transmitting the two signals independently was determined to be 3.01 dB. The average power of the individual transmissions from the two senders was compared to the average power of a beamformed joint transmission. The measurements show an average gain of 2.98 dB, which is consistent with the precision of the synchronization determined in the previous experiment. This result shows that, for all practical purposes, the testbed was able to achieve the full beamforming gain.

Figure 7:
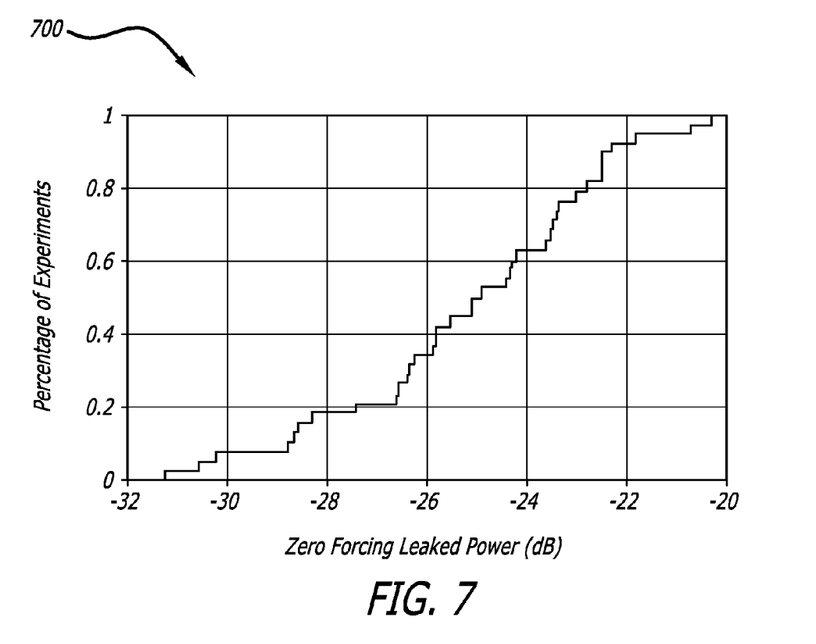
FIG. 7 is a plot of leaked power for tested embodiments, indicating a low leaked power using Zero-Forcing coding. The leaked power is significantly smaller than the total transmitted power, transforming each receiver's channel into a high SINR channel.
Figure 8:
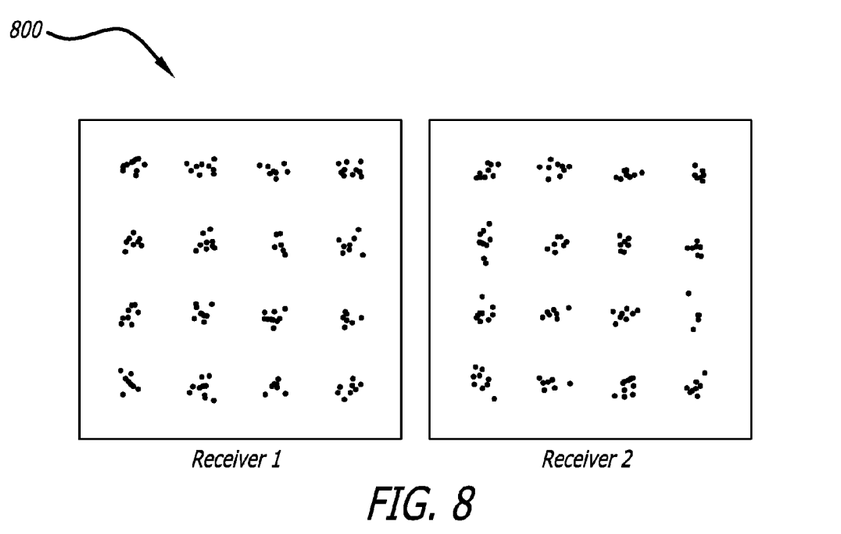
FIG. 8 is a scattering diagram for two independent data streams transmitted concurrently for two user channels, demonstrating achievement of complete separation of the user channels.

Zero-Forcing Accuracy: The following experiment measured the amount of power which is inadvertently leaked when using Zero-Forcing to non-targeted receivers due to synchronization errors. Again the radios were placed at random locations in the testbed. The channel coefficients were estimated and arranged for two equal amplitude tones from the two transmitters to sum as closely as possible to zero. The residual power is the leaked power due to angle mismatching. FIG. 7 illustrates a plot 700 of the CDF of this residual power for different measurements. The average power leaked is −24.46 dB of the total transmitted power. The leaked power is significantly smaller than the total transmitted power, transforming each receiver's channel into a high SINR channel. This establishes that Zero-Forcing is capable of almost completely eliminating interference at non-targeted receiver locations Zero-Forcing Beamforming Data Transmission: the final experiment that was performed transmitted data to the two receivers. The symbols used were chosen independently from a QAM-16 constellation at similar power levels. The set 800 of scattering plots in FIG. 8 illustrates the received signal at the two receivers. The scattering diagram for two independent data streams transmitted concurrently demonstrates that AirSync achieves complete separation of the user channels. The SINR values at the two receivers are 29 dB and 26 dB respectively. It is evident that the testbed achieves the full MIMO multiplexing gain. The scattering diagram for two independent data streams transmitted concurrently demonstrates that AirSync achieves complete separation of the user channels.

Medium Access Control (MAC) considerations: Given that the necessary synchronization accuracy between access points can be (and has been achieved), a MAC layer may be used in exemplary embodiments that significantly departs from the classic networking layered architectural model and adopts a cross-layer "PHY/MAC" design strategy.

As part of a high level overview, the issue of allocating air time and frequency spectrum between the uplink and the downlink is first considered. A choice is available between two natural strategies for separating the uplink from the downlink: time division duplex (TDD) and frequency division duplex (FDD). It may be preferable (and is in some embodiments) to choose TDD for two reasons. First, with TDD channel reciprocity can be exploited at the access point to measure the uplink channel, using pilots from the users, to infer the downlink channel as previously described. On the other hand, in FDD the uplink and downlink carrier frequencies are separated by much more than the channel coherence bandwidth, and therefore the channel matrix coefficients of the uplink and downlink channel are essentially statistically independent. Thus, in FDD no useful information about the downlink channel matrix can be learned from the uplink pilots. In this case, an explicit closed-loop channel estimation and feedback would need to be implemented, with a protocol overhead that increases linearly with the number of jointly precoded access point antennas; while not necessarily a preferred approach this is contemplated in and provided by embodiments of the present disclosure. Second, TDD is ideally suited for the transport of asymmetric traffic, as is typical in an enterprise Wi-Fi scenario, whereas an FDD system provides less flexibility for managing different traffic patterns. Below, the scheduling of users in the uplink and downlink periods are considered separately. In the uplink, clients compete for bandwidth using regular CSMA/CA. Thus, the following focuses on the downlink.

Downlink scheduling: The central server keeps track of packet queue sizes and other readily available QoS information, e.g., the time since these queues have been served last. It then selects a subset of users to transmit to at each downlink timeslot. At the start of the downlink period all access points send a jamming signal, causing the clients to backoff. The ensuing downlink transmission will silence the clients until the end of the downlink period. The following describes in detail how the central server selects these users at each time slot.

The selection and power allocation problem for linear Zero-Forcing precoding can be considered as an optimization problem. Conceptually, this optimization problem can be solved by exhaustively searching over all feasible subsets of users, optimizing a weighted rate function under some general power constraints. Greedy algorithms can provide excellent results at moderate complexity.

To simplify the design of the scheduling algorithm, a greedy algorithm can be used (e.g., one as described in M. Kobayashi and G. Caire, "Joint beamforming and scheduling for a MIMO downlink with random arrivals," IEEE ISIT (July 2006). However, real world considerations prompt a number of changes. Following the example of the de facto MIMO standard 802.11n, the same power may be allocated to all subcarriers instead of solving a complicated dual multiuser allocation and waterfilling problem. This can simplify the optimization problem significantly. Second, to achieve fairness among flows the construction of the utility function preferably takes into account the queue delays experienced by packets. This matters as it is well known that scheduling decisions which are solely based on queue sizes, while guaranteeing stability, lead to starvation and may lead to timeouts at higher layers, e.g., in TCP. In general, though, a non-flat spectrum will allow the system to get closer to the theoretically optimal performance.

Figure 9:
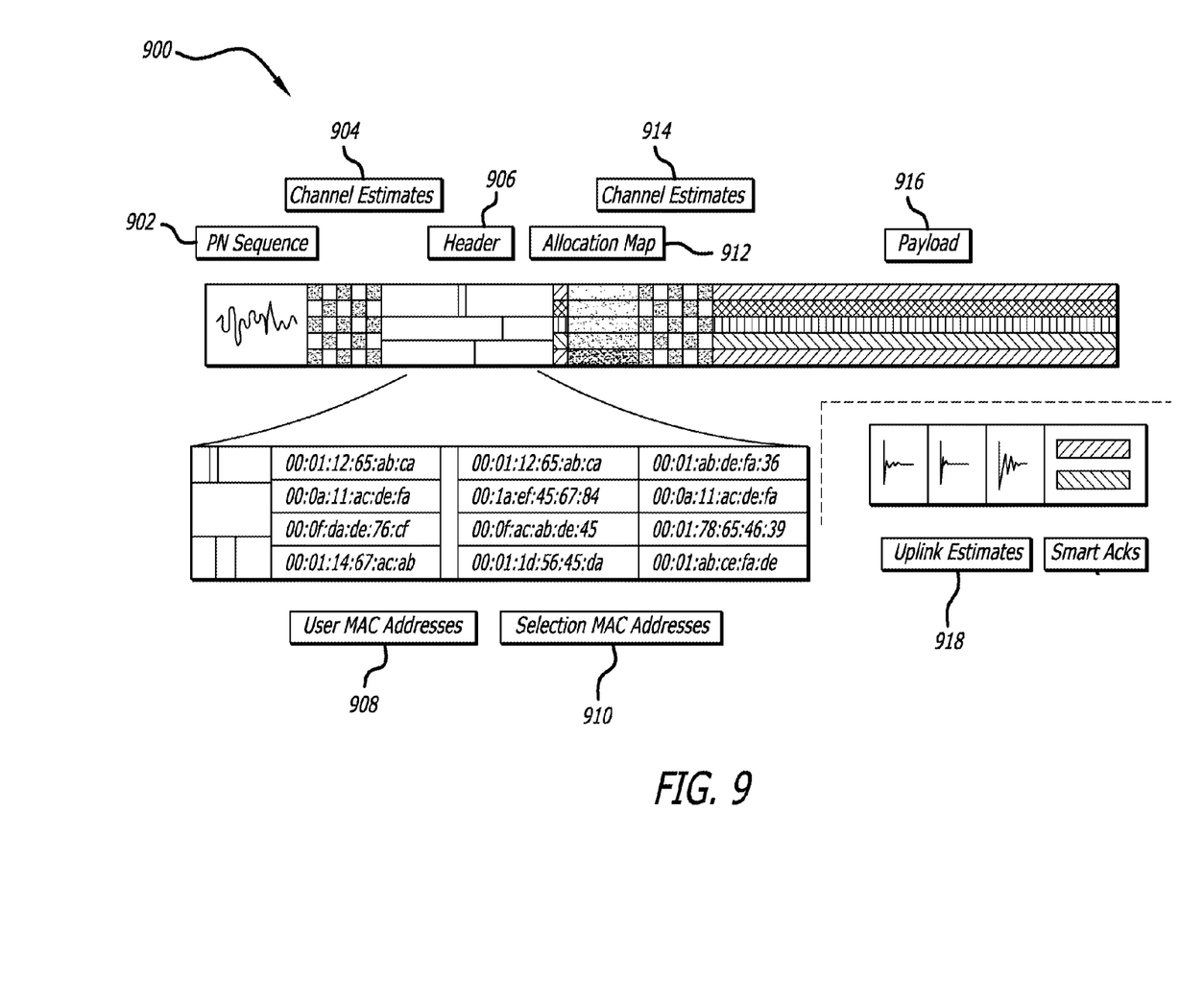
FIG. 9 a diagram of a packet design for preferred embodiments'; a downlink data packet is shown (at left) and an uplink acknowledgment is also shown (at bottom right).

FIG. 9 depicts a simplified schematic of downlink data packets 900 and corresponding uplink acknowledgments, according to an exemplary embodiment. The format of a download data packet 900 includes a probing header (e.g., a pseudonoise sequence) 902, followed by a number of channel estimates 904, and a header 906. The header 906 can include a user MAC address 908 and a selection MAC address 910. Continuing, the packet 900 can include an allocation map, 912, further channel estimates 914, and then a payload of data 916. A downlink data packet is shown (at left) and uplink acknowledgement is also shown (bottom right). The MAC layer packet design and the protocol's sequence of actions are tuned for enabling multiuser MIMO broadcasts. One design constraint or consideration is to provide the central server with timely estimates of the channel state information for all clients to which it is about to transmit or which are considered for the next round of transmissions. For this purpose, downlink transmissions are preferably constructed to closely follow uplink acknowledgments and require the clients to provide the server with channel estimates during the uplink period. The mechanism through which this is achieved is described in further detail below. The central server can use the uplink estimates 918 to select a set of clients for the following transmission slots, according to the scheduling algorithms introduced earlier.

The downlink packet 900 starts with a transmission from the main sender (central server) containing a pseudo-noise sequence used to achieve frame alignment by the transmitters and for block boundary detection by the receivers. The master access point (main transmitter) then transmits the first set of channel estimation pilots which are used by the other access points to determine the initial phases of the subcarrier tones. After this point, all access points take part in the downlink transmission. The packet header that follows is broadcast to all clients, including the non-targeted ones, using the Alamouti encoding. Due to phase alignment between transmitters, the clients do not need to track the secondary senders in order to decode this header. The MAC addresses of the hosts targeted in the current transmission and the MAC addresses of the clients that are required to provide the server with channel estimates during the next acknowledgment are the most important pieces of information contained in the header fields. The positions of the addresses in the header fields create an implicit ordering of the clients, which will be used in the uplink period. The following part of the header is an allocation map, similar to the one found in the LTE standard, which assigns carriers to small groups of different clients and specifies the constellations used in broadcasting to them. The header is followed by a second set of channel estimation pilots, transmitted this time around by all access points using ZFBF, which are used by all clients in order to obtain the channel estimates for their individual downlink channels. The clients use the downlink estimates together with the synchronization pilot tones in order to gain a lock on the subcarriers. The downlink transmission continues with payload transmission.

In current 802.11 MIMO implementations, the channel estimates are obtained using downlink pilots which are in turn quantized by the receivers and communicated back in numerical form to the transmitter. The quantization and communication steps incur a large overhead. Using the reciprocity property of wireless channels, the complexity of the channel estimation process can be reduced significantly. It may be preferable to perform uplink channel estimation first, since uplink estimates can be received simultaneously by all access points, reducing the number of pilot transmissions needed by a factor equal to the total number of access point antennas. Second, uplink estimates are sent using analog pilot signals in an unquantized form, leaving the quantization step to the access points. This reduces the overhead of the transmission significantly. Third, while the usual estimation pilots are full OFDM frames, pulse-like signals can be sent, the channel response can be measured, and the non-significant taps can be filled with zeros before taking a Fourier transform in order to determine the frequency domain response. This insures that the pilots used need to be spaced only by an interval that can accommodate a long channel response, i.e., the length of a cyclic prefix.

After the downlink transmission has finished, the clients who have been requested to send their channel estimates start sending these short estimation pilots in quick succession. There is a large degree of similarity between the functioning of the downlink channel estimation for receive decode purposes and the uplink channel estimation step. The timing of the system remains unchanged during the uplink slot and the roles of the transmitters and the receivers are switched. The uplink pilots are followed by smart acknowledgments for the data packets sent (e.g., using a suitable technique). The overhead of the MAC is essentially that of 802.11n. The additional signaling overhead comes from requiring a few frames to predict the initial phase, and a few frames to dictate the MAC addresses of the nodes from which channel state information is to be requested for the next time slot. Even with very conservative estimates this will be less than, e.g., a 20% increase in header time duration over that of a traditional 802.11 system. A bandwidth increase is realized that grows almost linearly in the number of clients. This means that the overhead, normalized to consider the total control bits over the total data bits transmitted during a fixed airtime slot, is much less than in a traditional 802.11 system.

Exemplary Implemented Embodiment

An exemplary embodiment of AirSync was implemented as a digital circuit in a FPGA of a wireless open access research platform ("WARP") radio platform. The design of the WARP radio platform is made available by Rice University. The WARP radio board utilizes a dual-band direct conversion radio transceiver from Maxim, the MAX2829. This transceiver supports both the 2.4 GHz and 5 GHz ISM bands. Although it is intended for use in 802.11a/b/g/n designs, this transceiver provides a flexible analog baseband interface. This interface allows the translation of any waveform, with a bandwidth up to 40 MHz, between baseband and RF, regardless of the waveform's adherence to an 802.11 standard. Further, when driven by a common reference clock, the phase coherency of the local oscillators in multiple MAX2829 transceivers is provided. This feature is desirable in MIMO applications as many algorithms require carefully controlled phase relationships and accurate measurements of phase among multiple antennas.

The WARP radio is a modular software radio platform composed of a central motherboard hosting an FPGA and several daughterboards containing radio frequency (RF) front-ends. The entire timing of the platform is derived from only two reference oscillators, hosted on a separate clock board: a 20 MHz oscillator serving as a source for all sampling signals and a 40 MHz oscillator which feeds the carrier clock inputs of the transceivers present on the RF front-ends. The shared clocks assure that all signals sent and received using the different front-ends are phase synchronous. Phase synchronicity for all sent signals or for all received signals is a common characteristic of MIMO systems. However, the fact that the design of the WARP ensures phase synchronicity among the sent and received signals, as opposed to using separate oscillators for modulation and demodulation, greatly simplifies the synchronization task. The system's data bandwidth is 5 MHz. The synchronization tones can be placed outside the data bandwidth, e.g., at about 7.5 MHz above and below the carrier frequency. The placement of the carriers allows exploitation of the adjustable baseband sender filter present in the transmit signal path in order to avoid, in the case of the pilot tones, any self-interference at the secondary transmitters.

A complete system-on-chip design was implemented in the FPGA of the WARP radio, taking advantage of the presence of hard-coded ASIC cores such as a PowerPC processor, a memory controller capable of supporting transfers through direct memory access over wide data buses and a gigabit Ethernet controller. Atop this system-on chip architecture the NetBSD operating system was ported, and drivers were created for all the hardware components hosted on the platform, capable of setting all system and radio board configuration parameters. The operating system runs locally but mounts a remote root file system through NFS. In the same system-on-chip architecture, a signal processing component created in Simulink was integrated which provides interfaces for fast direct memory access. This later component is responsible for all the waveform processing and for the synthesis of a phase synchronous signal and interfaces directly with the digital ports of the radio front-ends. The Ethernet controller and the signal processing component were interfaced using an operating system kernel extension responsible for performing zero-copy, direct memory access data transfers between the two, with the purpose of passing back and forth waveform data at high rates between a host machine and the WARP platform. The large data rates needed (320 Mbps for a 10 MHz wireless signal sampled with 16 bit precision) required optimizing the packet transfers into and out of the WARP. For example, consider the direct memory access ring associated with the receive end of the Ethernet controller on the board, which is shared between packets destined to the signal processing component and packets destined to the upper layers of the operating system stack. Release and reallocation of the memory buffers occupied by packets destined to the signal processing component was not seen as being necessary. Instead, a lazy garbage collection algorithm was used in order to reclaim these buffers when they are consumed in a timely manner or reallocate them at a later point if they are not consumed before the memory ring runs low on available memory buffers. The rationale for this particular optimization is that the overhead of managing the virtual-memory based reallocation of memory buffers of tens of thousands of packets every second would bring the processor of the software radio platform to a halt.

All transmitting WARP radios are connected to a central processing server through individual Ethernet connections operating at gigabit speeds. Most of the signal synthesis for the packet transmission is done offline, using Matlab code. Precoded packets were produced in the form of frequency domain soft symbols. However, the synchronization step and the subsequent signal generation is left to the FPGA. The server, a fast machine with 32 processor cores and 64 GB of RAM, encodes the transmitted packets and streams the resulting waveforms to the radios.

In wireless communication systems, different rates are usually supported using different codes. The current standard, 802.11n, offers many code combinations to fully utilize the capacity of the MIMO channel. Since a multiuser MIMO system serves multiple users in the same time slot, an even larger set of rates and codes would have to be supported for efficiently using capacity. So called rateless codes (e.g., Raptor codes and the recently proposed Spinal codes) may be used at the physical layer, in a so-called Incremental Redundancy (IR) configuration, to decrease the signaling and retransmission overhead.

In summary, the present disclosures provides the following:

An introduction and description of the AirSync technology, the first scheme known to achieve phase synchronization in a distributed multiuser MIMO setting;

A description of an implemented embodiment of AirSync as a digital circuit in the FPGA of the WARP platform;

A description of experimental results observed from a testbed consisting of 4 WARP radios, including that AirSync can achieve the theoretically optimal spatial multiplexing gain in practice; and A description of practical implementation aspects of preferred MAC schemes used in conjunction with an example of an AirSync distributed MIMO system.

Further details regarding methods, processes, materials, modules, components, steps, embodiments, applications, features, and advantages are set forth in related U.S. Provisional Application No. 61/651,964, including attached Exhibits 1-7: Exhibit 1, "AirSync: Enabling Distributed Multiuser MIMO with Full Spatial Multiplexing" (15 pages); Exhibit 2, "I. Incremental Redundancy, Rateless Coding, and Multiuser Scheduling" (6 pages); Exhibit 3, "The Throughput of Hybrid-ARQ Protocols for the Gaussian Collision Channel" (19 pages); Exhibit 4, "Incremental Redundancy Hybrid ARQ Schemes Based on Low-Density Parity-Check Codes" (12 pages); Exhibit 5, "Joint Beamforming and Scheduling for a MIMO Downlink with Random Arrivals" (6 pages); Exhibit 6, "Multiuser MIMO Achievable Rates With Downlink Training and Channel State Feedback" (23 pages); and Exhibit 7, "On the Optimality of Multiantenna Broadcast Scheduling Using Zero-Forcing Beamforming" (15 pages). The entire content of Exhibits 1-7 of the reference application is incorporated herein in its entirety. All documents that are cited in Exhibits 1-7 are also incorporated herein by reference in their entirety.

EQUIVALENTS

The components, steps, features, objects, benefits and advantages which have been discussed are merely illustrative. None of them, or the discussions relating to them, is intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Examples of such equivalents can include any of the following:

Predictive filtering (prediction): while embodiments have been described herein as utilizing Kalman filters and related techniques, other types of prediction may of course be employed. Examples include, but are not limited to, the extended Kalman filter, the so-called unscented Kalman filter, the Kalman-Bucy filter, and the hybrid Kalman filter, the particle filter, the unscented particle filter, and the like; other suitable prediction tools and techniques may also be utilized.

Precoding: while embodiments have been described herein as utilizing so-called Zero-Forcing Beamforming (ZFBF) (e.g., linear ZFBF), other types of predcoding may of course be employed. Examples include, but are not limited to, regularized ZFBF, lattice reduction, regularized vector perturbation, and Tomlinson Harashima precoding and other approximations of Dirty Paper Coding schemes, and the like; other suitable precoding techniques may also be utilized.

Coding: while embodiments have been described herein as utilizing coding techniques currently supported by IEEE 802.11n, other types of coding may of course be employed. Examples include, but are not limited to, rateless codes such as so-called Raptor codes, and spinal codes, e.g., in a so-called incremental redundancy (IR) configuration. Such may be implemented at the Physical Layer (PHY); other suitable coding techniques may also be utilized. For example, such coding may be implemented in or facilitated by a Data Link Layer or equivalent layer. Such coding may be performed in or facilitated by other layers in addition or substitution for the previously noted layers, e.g., a Network Layer, a Transport Layer, etc. Such layers may be part of or conform to any suitable data transmission protocol.

Unless otherwise stated, all measurements, values, ratings, positions, magnitudes, sizes, and other specifications which are set forth in this specification are approximate, not exact. They are intended to have a reasonable range which is consistent with the functions to which they relate and with what is customary in the art to which they pertain.

All articles, patents, patent applications, and other publications which have been cited are hereby incorporated herein by reference.

What is claimed is:

1. A system for implementing distributed multi-user MIMO with spatial multiplexing, the system comprising:
    a main transmitter operative to transmit (i) a plurality of packets with data over a transmission band, and (ii) a reference signal including a pilot tone, wherein each packet includes a format with an initial probing header and a number of channel estimation symbols;
    one or more secondary transmitters operative to receive the probing header transmitted by the main transmitter and determine a block timing of the packet; and
    a central server operative to select one or more clients that are each operative to receive data over separate channels within the transmission band and to process channel estimation symbols for each of the main and secondary transmitters.

2. The system of claim 1, wherein the pilot tone is out of band relative to the transmission band.

3. The system of claim 1, wherein each secondary transmitter is operative to track the phase of the pilot tone for estimating an associated phase drift from the main transmitter.

4. The system of claim 1, each secondary transmitter includes a synchronization circuit operative to detect the initial probing header and to determine a block timing of the packet.

5. The system of claim 1, wherein the central server is operative to provide precoding for the data transmitted by each of the main transmitter and the one or more secondary transmitters.

6. The system of claim 5, wherein the precoding comprises zero-forcing beamforming (ZFBF).

7. The system of claim 5, wherein, for each of the transmitters, the central server is operative to compute a waveform of the signal to be transmitted in the next downlink slot.

8. A system for implementing distributed multi-user MIMO with spatial multiplexing, the system comprising:
    a memory;
    a processor having access to the memory and configured to:
        cause a main transmitter to transmit (i) a plurality of packets with data over a transmission band, and (ii) a reference signal including a pilot tone, wherein each packet includes a format with an initial probing header and a number of channel estimation symbols;
        cause one or more secondary transmitters to receive the probing header transmitted by the main transmitter and determine a block timing of the packet; and
        cause a central server to select one or more clients that are each operative to receive data over separate channels within the transmission band and to process channel estimation symbols for each of the main and secondary transmitters.

9. The system of claim 8, wherein the pilot tone is out of band relative to the transmission band.

10. The system of claim 8, wherein each secondary transmitter is operative to track the phase of the pilot tone for estimating an associated phase drift from the main transmitter.

11. The system of claim 8, each secondary transmitter includes a synchronization circuit operative to detect the initial probing header and to determine a block timing of the packet.

12. The system of claim 8, wherein the central server is operative to provide precoding for the data transmitted by each of the main transmitter and the one or more secondary transmitters.

13. The system of claim 12, wherein the precoding comprises zero-forcing beamforming (ZFBF).

14. The system of claim 12, wherein, for each of the transmitters, the central server is operative to compute a waveform of the signal to be transmitted in the next downlink slot.

* * * * *